(12) United States Patent
Schoenrock

(10) Patent No.: US 9,479,471 B2
(45) Date of Patent: Oct. 25, 2016

(54) NETWORKED TRANSMISSION OF RECIPROCAL IDENTITY RELATED DATA MESSAGES

(71) Applicant: EQUIFAX, INC., Atlanta, GA (US)

(72) Inventor: Peter Schoenrock, Duluth, GA (US)

(73) Assignee: EQUIFAX INC., Atlanta, GA (US)

( * ) Notice: Subject to any disclaimer, the term of this patent is extended or adjusted under 35 U.S.C. 154(b) by 192 days.

(21) Appl. No.: 13/803,095

(22) Filed: Mar. 14, 2013

(65) Prior Publication Data

US 2014/0189003 A1    Jul. 3, 2014

Related U.S. Application Data

(60) Provisional application No. 61/747,018, filed on Dec. 28, 2012.

(51) Int. Cl.
  *G06F 15/16*   (2006.01)
  *H04L 12/58*   (2006.01)
  *G06Q 20/36*   (2012.01)
  (Continued)

(52) U.S. Cl.
  CPC ............... *H04L 51/14* (2013.01); *H04L 63/10* (2013.01); *G06Q 20/363* (2013.01); *G06Q 20/40* (2013.01); *H04L 51/04* (2013.01); *H04L 63/102* (2013.01); *H04W 12/08* (2013.01)

(58) Field of Classification Search
  CPC ... G06Q 20/363; G06Q 20/40; H04W 12/08; H04L 63/102; H04L 51/04
  See application file for complete search history.

(56) References Cited

U.S. PATENT DOCUMENTS 6,785,661 B1    8/2004   Mandler et al.
7,028,052 B2 *  4/2006   Chapman et al.
  (Continued)

FOREIGN PATENT DOCUMENTS

JP   2001101212     4/2001
KR   1020110053185  5/2011
  (Continued)

OTHER PUBLICATIONS

PCT Patent Application No. PCT/US2013/075901, International Search Report and Written Opinion mailed on Apr. 8, 2014, 10 pages.
  (Continued)

*Primary Examiner* — Wing F Chan
*Assistant Examiner* — Joseph Maniwang
(74) *Attorney, Agent, or Firm* — Robert J. Curylo; Kilpatrick Townsend & Stockton LLP

(57) ABSTRACT

Computer-implemented systems and methods for networks that transmit credit, non-credit or identity related alert messages or other identity related messages relating to a secondary person, minor, or other person to a primary person's device. According to certain embodiments, two or more consenting adults, such as, for example, spouses, can have identity related messages relating to their credit status, and in some cases minors' credit status, transmitted to the device of the other person or persons as well as their own device. Each individual's device is able to communicate with the system in order to control what identity related messages the system transmits to their devices, as well as to devices of the other adult. The system automatically terminates transmitting messages if a fraud event occurs. Each individual's device is also able to terminate transmission of such messages to devices of the other adult.

14 Claims, 5 Drawing Sheets

(51) Int. Cl.
   *G06Q 20/40* (2012.01)
   *H04L 29/06* (2006.01)
   *H04W 12/08* (2009.01)

(56) References Cited

U.S. PATENT DOCUMENTS

| | | | |
|---|---|---|---|
| 7,155,514 B1 | 12/2006 | Milford et al. | |
| 7,364,073 B2 | 4/2008 | Webb | |
| 7,542,993 B2* | 6/2009 | Satterfield et al. | |
| 7,841,004 B1* | 11/2010 | Balducci | G06Q 20/02 455/410 |
| 8,086,525 B2 | 12/2011 | Atwood et al. | |
| 8,271,894 B1 | 9/2012 | Mayers | |
| 8,286,239 B1 | 10/2012 | Sutton | |
| 8,661,062 B1 | 2/2014 | Jamail et al. | |
| 8,850,536 B2 | 9/2014 | Liberman et al. | |
| 8,862,610 B2 | 10/2014 | Hennings et al. | |
| 2002/0147805 A1 | 10/2002 | Leshem et al. | |
| 2003/0018558 A1 | 1/2003 | Heffner et al. | |
| 2003/0139990 A1 | 7/2003 | Greco | |
| 2003/0212618 A1 | 11/2003 | Keyes et al. | |
| 2004/0210527 A1 | 10/2004 | Woda et al. | |
| 2004/0215757 A1 | 10/2004 | Butler et al. | |
| 2004/0245330 A1 | 12/2004 | Swift et al. | |
| 2005/0065872 A1 | 3/2005 | Moebs et al. | |
| 2005/0119961 A1 | 6/2005 | Tanzillo et al. | |
| 2006/0074793 A1 | 4/2006 | Hibbert et al. | |
| 2006/0117028 A1 | 6/2006 | Harrison et al. | |
| 2006/0184393 A1* | 8/2006 | Ewin et al. | 705/2 |
| 2006/0226216 A1 | 10/2006 | Keithley et al. | |
| 2006/0293981 A1 | 12/2006 | McNelley et al. | |
| 2007/0226130 A1 | 9/2007 | Haggerty et al. | |
| 2008/0120699 A1 | 5/2008 | Spear | |
| 2008/0126233 A1* | 5/2008 | Hogan | 705/35 |
| 2008/0288330 A1 | 11/2008 | Hildebrand et al. | |
| 2009/0089803 A1 | 4/2009 | Biggs | |
| 2009/0125427 A1 | 5/2009 | Atwood et al. | |
| 2009/0300711 A1 | 12/2009 | Tokutani et al. | |
| 2010/0205005 A1* | 8/2010 | Pritchett et al. | 705/3 |
| 2010/0241559 A1 | 9/2010 | O'Connor et al. | |
| 2010/0250411 A1 | 9/2010 | Ogrodski et al. | |
| 2010/0269168 A1 | 10/2010 | Hegli et al. | |
| 2010/0318604 A1 | 12/2010 | Stafie et al. | |
| 2011/0212430 A1* | 9/2011 | Smithmier et al. | 434/322 |
| 2011/0239278 A1* | 9/2011 | Downey et al. | 726/4 |
| 2012/0102545 A1 | 4/2012 | Carter, III et al. | |
| 2012/0144198 A1 | 6/2012 | Har et al. | |
| 2012/0330837 A1* | 12/2012 | Persaud et al. | 705/44 |
| 2013/0159446 A1* | 6/2013 | Carlson et al. | 709/207 |
| 2013/0311326 A1* | 11/2013 | Lucas et al. | 705/26.8 |
| 2014/0189098 A1 | 7/2014 | MaGill et al. | |

FOREIGN PATENT DOCUMENTS

| | | |
|---|---|---|
| WO | 2006002358 A2 | 1/2006 |
| WO | 2006080914 A1 | 8/2006 |
| WO | 2009059116 A2 | 5/2009 |
| WO | 2009059116 A3 | 6/2009 |
| WO | 2012167165 | 12/2012 |
| WO | 2014105538 | 7/2014 |
| WO | 2014105673 | 7/2014 |

OTHER PUBLICATIONS

PCT Patent Application No. PCT/US2013/076810, International Search Report and Written Opinion mailed on Mar. 26, 2014, 9 pages.

Transunion / SmartMoye Click.Check.Rent, http://www.mysmartmove.com, Sep. 16, 2008 (1 page).

TransUnion's Smart Move Provides Independent Rental Owners With New Level of Risk Insight, Transunion, http://newsroom.transunion.com/index.php?s=43&item=487, Sep. 16, 2008 (2 pages).

European Patent Application No. 13866968.4, Extended European Search Report, mailed Jul. 6, 2016, 8 pages.

European Patent Application No. 13867871.9, Extended European Search Report, mailed Aug. 8, 2016, 8 pages.

* cited by examiner

NETWORKED TRANSMISSION OF RECIPROCAL IDENTITY RELATED DATA MESSAGES

CROSS-REFERENCE TO RELATED APPLICATIONS

This application claims the benefit of U.S. Provisional Application No. 61/747,018, filed Dec. 28, 2012 and titled "Networked Access of Credit Related Information," the entirety of which is incorporated herein by reference.

TECHNICAL FIELD

This document relates generally to computer-implemented systems and methods that transmit, to the device of a primary person, identity related messages that concern credit, non-credit and/or identity status of a secondary person, minor, or other person.

BACKGROUND

Identity related information systems (sometimes, "systems") currently deliver credit, bank account or other non-credit and/or identity related alerts or other messages ("identity related messages") to computers, smartphones, or other devices ("devices") of individuals who have established a monitoring account on the system for the purpose of monitoring their credit, non-credit or identity related information ("identity related information"). Identity related messages can include, for instance, messages or alerts that a credit rating has changed, an account balance has changed, or that the person's identity is being misappropriated. Sometimes an identity related message can advise the individual to review their account on the system to learn the nature of the identity related information that gave rise to generation of the identity related message. Accordingly, such identity related messages are transmitted to the device of the individual that owns the account ("primary person"). Systems and methods would be desirable that could generate and transmit identity related messages relating to a primary person's spouse or other family member or a third party ("secondary person") or children or other minor persons ("minor"), to the device of the primary person. Particularly desirable would be such systems and methods in which the secondary person, using his or her device, could communicate with the system to terminate at will the transmission of identity related messages to the primary person's device that are related to the secondary person's identity information on the system.

SUMMARY

According to some embodiments, identity related messages are transmitted to devices of individuals who desire to monitor their individual identity related information on the system. According to certain embodiments of the invention, two or more consenting adults, such as, for example, spouses, can have identity related messages relating to them transmitted to the device of the other person as well as their own device. Each individual's device is able to communicate with the system in order to control what identity related messages the system transmits to their devices, as well as to devices of the other adult. Each individual's device is also able to terminate transmission of such messages to devices of the other adult.

A primary person, who holds the primary person account on the system (and preferably the individual who pays for the service), is able to identify another adult (the secondary person) whose device is to receive the identity related messages, by designating on his or her device (among other ways) the secondary person's email address, mobile number, landline number, or other electronic address or identifying data for the device. The primary person's device designates such identifying data and the identity related information system transmits an email, SMS, or other message to the secondary person. The secondary person is prompted to use his or her device to communicate with the system (including to enroll if they do not have an account). The secondary person's device and the system communicate to authenticate the second person and once authenticated, the secondary person's device may communicate with the system to enable the reciprocal monitoring and sharing of predetermined identity related messages. If the devices of both the primary and secondary persons enable the reciprocal identity monitoring, then (for example) if the device of either individual is transmitted an identity related message, the other individual's device will receive the same message. There is thus (among other things) less chance of an identity related message to go unread.

Communications among devices in according with certain embodiments of the invention can be implemented using electronic mail, text, apps on mobile devices, or as otherwise desired.

In accordance with certain embodiments of the invention, the primary person can designate multiple secondary persons and these embodiments can operate as disclosed in this document with respect to each such secondary person. For example, if a primary person designates two secondary persons, if the device of either secondary person is transmitted an identity related message, the primary person's device and the other secondary person's device can receive the same message, subject to freezes and terminations as disclosed below. Additionally, a secondary person can then operate as a primary person in accordance with certain embodiments of the invention; a secondary person who has agreed to reciprocal monitoring and sharing of predetermined identity related messages and information can in turn identify other persons (such as for example elderly parents) who can become secondary persons.

In manners somewhat similar, a primary person, using his or her device, can also identify or designate a minor individual as the subject of predetermined identity related messages to be provided to the primary person. The system can generate identity related information as to the minor and can provide identity related messages based on such information to the device of the primary person. The system can set flags or take other measures to freeze identity related messages as to such minor to any other third party. The system is also able automatically to cancel or terminate monitoring of the minor's identity related information when the minor reaches age of majority. Primary persons and secondary persons can identify multiple minor persons whose identity related messages can be transmitted to devices of the primary persons and secondary persons as disclosed in this document.

According to some embodiments, such as for instance, where the secondary person already has an account on the identity related information system, there is provided systems and methods for transmitting identity related messages, comprising:

Storing, on an identity related information system, primary person identity related information related to a primary person, the primary person identity related information accessible by a primary person device upon receipt by the system of primary person username and password information from the primary person device;

Storing, on the identity related information system, secondary person identity related information related to a secondary person, the secondary person identity related information accessible by a secondary person device upon receipt of secondary person username and password information from the secondary person device;

Receiving, in the identity related information system, a secondary person request message from the primary person device, the secondary person request message requesting that predetermined secondary person identity related messages relating to the secondary person identity related information be transmitted to the primary person device;

Automatically determining whether the identity related information system includes an account for the secondary person who is the subject of the secondary person request message;

Upon determination that the identity related information system includes an account for the secondary person who is the subject of the secondary person request message, transmitting, by the identity related information system, a secondary person authorization request message to the secondary person device, the secondary person authorization request message including a request for authorization to transmit the predetermined secondary person identity related messages to a primary person device;

Receiving, in the identity related information system, a secondary person authorization response message from the secondary person device, the secondary person authorization response message authorizing the identity related information system to transmit the predetermined secondary person identity related messages to a primary person device;

Determining, by the identity related information system, if there is a change in predetermined secondary person identity related information stored in the identity related information system; and Transmitting, by the identity related information system, a predetermined secondary person identity related message to a primary person device if the identity related information system determines there is a change in predetermined secondary person identity related information stored in the identity related information system.

According to some embodiments, such as for instance, where the secondary person does not already have an account that contains identity related information, there is provided systems and methods for transmitting identity related messages, comprising:

Storing, on an identity related information system, primary person identity related information related to a primary person, the primary person identity related information accessible by a primary person device upon receipt of primary person username and password from the primary person device;

Receiving, in the identity related information system, a secondary person request message from the primary person device, the request information requesting that predetermined secondary person identity related messages relating to secondary person identity related information be transmitted to the primary person device;

Automatically determining whether the identity related information system includes an account for the secondary person who is the subject of the secondary person request message;

Transmitting, by the identity related information system, a secondary person enrollment and authorization request message to a secondary person device, the secondary person enrollment and authorization request message including a request that the secondary person device establish a secondary person account in the identity related information system and for authorization to transmit the predetermined secondary person identity related messages to a primary person device;

Receiving, in the identity related information system, a secondary person enrollment and authorization response message from the secondary person device, the secondary person enrollment and authorization response message including instructions to establish an account in the identity related information system and authorizing the identity related information system to transmit the predetermined secondary person identity related messages to a primary person device;

Establishing a secondary person account for the secondary person in the identity related information system;

Storing, on the identity related information system, secondary person identity related information related to the secondary person, the secondary person identity related information accessible to the secondary person upon receipt of secondary person username and password information from the secondary person device;

Determining, by the identity related information system, if there is a change in predetermined secondary person identity related information stored in the identity related information system; and Transmitting, by the identity related information system, a predetermined secondary person identity related message to a primary person device if the identity related information system determines there is a change in predetermined secondary person identity related information stored in the identity related information system.

According to some embodiments, such as for instance, where identity related messages relating to a minor person are desired to be transmitted to a primary person device, there is provided systems and methods for transmitting minor identity related messages to a primary person device, comprising:

Storing, on an identity related information system, primary person identity related information related to a primary person, the primary person identity related information accessible by a primary person device upon receipt of primary person username and password from the primary person device;

Receiving, in the identity related information system, a minor person request message from the primary person device, the minor person request message including name and date of birth for a minor person and requesting that predetermined minor person identity related messages be transmitted to the primary person device;

Automatically verifying in the identity related information system that minor person identity related information is stored in the identity related information system for a minor person corresponding to the name and date of birth stated in the minor person request message, or automatically creating new minor person identity related information for a minor person corresponding to the name and date of birth stated in the minor person request message;

Storing, on the identity related information system, minor person identity related information related to the minor person;

Determining, by the identity related information system, if there is a change in predetermined minor person identity related information stored in the identity related information system;

Receiving an authentication message authenticating that there is a predetermined legal relationship between the primary person and the minor person, the authentication message based on documents proving the legal relationship between the primary person and the minor person;

Transmitting, by the identity related information system, a predetermined minor person identity related message to a primary person device if the identity related information system determines there is a change in predetermined minor person identity related information stored in the identity related information system;

Automatically freezing access to the minor person identity related information by the device of any party other than a primary person or a secondary person; and Automatically freezing transmission of minor person identity related messages to the device of any party other than a primary person device or a secondary person device.

According to some embodiments, such as for instance, where both secondary person identity related messages and minor person identity related messages are desired to be transmitted to a primary person device, there is provided systems and methods for transmitting secondary person identity related messages and minor person identity related messages to a primary person device, comprising:

Storing, on an identity related information system, primary person identity related information related to a primary person, the primary person identity related information accessible by a primary person device upon receipt of primary person username and password from the primary person device;

Receiving, in the identity related information system, a secondary person request message from the primary person device, the secondary person request message requesting that predetermined secondary person identity related messages relating to secondary person identity related information be transmitted to the primary person device;

Transmitting, by the identity related information system, a secondary person enrollment and authorization request message to a secondary person device, the secondary person enrollment and authorization request message including a request that the secondary person device establish a secondary person account in the identity related information system and for authorization to transmit the predetermined secondary person identity related messages to a primary person device;

Receiving, in the identity related information system, a secondary person enrollment and authorization response message from the secondary person device, the secondary person enrollment and authorization response message including instructions to establish an account in the identity related information system and authorizing the identity related information system to transmit the predetermined secondary person identity related messages to a primary person device;

Storing, on the identity related information system, secondary person identity related information related to the secondary person, the secondary person identity related information accessible to the secondary person upon receipt of secondary person username and password information from the secondary person device;

Receiving, in the identity related information system, a minor person request message from the primary person device, the minor person request message including name and date of birth for a minor person and requesting that predetermined minor person identity related messages be transmitted to the primary person device;

Automatically verifying in the identity related information system that minor person identity related information is stored in the identity related information system for a minor person corresponding to the name and date of birth stated in the minor person request message, or automatically creating new minor person identity related information for a minor person corresponding to the name and date of birth stated in the minor person request message;

Storing, on the identity related information system, minor person identity related information related to the minor person;

Determining, by the identity related information system, if there is a change in predetermined secondary person identity related information stored in the identity related information system;

Receiving an authentication message authenticating that there is a predetermined legal relationship between the primary person and the minor person, the authentication message based on documents proving the legal relationship between the primary person and the minor person;

Transmitting, by the identity related information system, a predetermined secondary person identity related message to a primary person device if the identity related information system determines there is a change in predetermined secondary person identity related information stored in the identity related information system.

Determining, by the identity related information system, if there is a change in predetermined minor person identity related information stored in the identity related information system;

Transmitting, by the identity related information system, a predetermined minor person identity related message to a primary person device if the identity related information system determines there is a change in predetermined minor person identity related information stored in the identity related information system;

Automatically freezing access to the minor person identity related information by the device of any party other than a primary person or a secondary person; and Automatically freezing transmission of minor person identity related messages to the device of any party other than a primary person device or a secondary person device.

In some embodiments, the identity related information system can also automatically transmit predetermined primary person identity related messages to a secondary person device when the identity related information system determines there is a change in predetermined primary person identity related information stored in the identity related information system.

In some embodiments, transmission of the secondary person identity related messages to the primary person device can be cancelled upon receipt by the identity related information system of a secondary person cancellation message transmitted from the secondary person device. In some embodiments, when transmission of the secondary person identity related messages to the primary person device is cancelled, secondary person identity related information stored in the identity related information system at time of receipt by the system of the cancellation message remains accessible by the primary person device. In some embodiments, transmission of the primary person identity related messages to the secondary person device can be cancelled upon receipt by the identity related information system of a primary person cancellation message transmitted from the primary person device. In some embodiments, when transmission of the primary person identity related messages to the secondary person device is cancelled, primary person identity related information stored in the identity related information system at time of receipt by the system of the cancellation message remains accessible by the secondary person device.

In some embodiments upon receipt by the primary person device of a secondary person identity related message, the primary person device can access secondary person identity related information stored in the identity related information system using the primary person user name and password. In some embodiments, upon receipt by the secondary person device of a primary person identity related message, the secondary person device can access primary person identity related information stored in the identity related information system using the secondary person user name and password.

In some embodiments, the identity related information system can control the secondary person identity related information stored in the identity related information system that is accessible by the primary person device. In some embodiments, the identity related information system can control the primary person identity related information stored in the identity related information system that is accessible by the secondary person device.

In some embodiments, the secondary person device can control the secondary person identity related information that is accessible by the primary person device. In some embodiments, the primary person device can control the primary person identity related information that is accessible by the secondary person device.

In some embodiments, the primary person identity related message includes an alert that primary person identity related information has changed. In some embodiments, the secondary person identity related message includes an alert that secondary person identity related information has changed.

In some embodiments, the identity related information system automatically stops transmitting secondary person identity related messages to the primary person device when the identity related information system detects a fraud event. In some embodiments, the identity related information system automatically stops transmitting primary person identity related messages to the secondary person device when the identity related information system detects a fraud event. In some embodiments, the identity related information system automatically stops transmitting minor person identity related messages to the primary person device when the identity related system detects a fraud event.

In some embodiments, the identity related information system discontinues determining if there is a change in predetermined minor person identity related information stored in the identity related information system when the identity related information system receives an emancipation message that the minor has emancipated or when the identity related information system detects expiration of a predetermined time period after date of birth stated in the minor person's identity related information.

DETAILED DESCRIPTION

Figure 1:
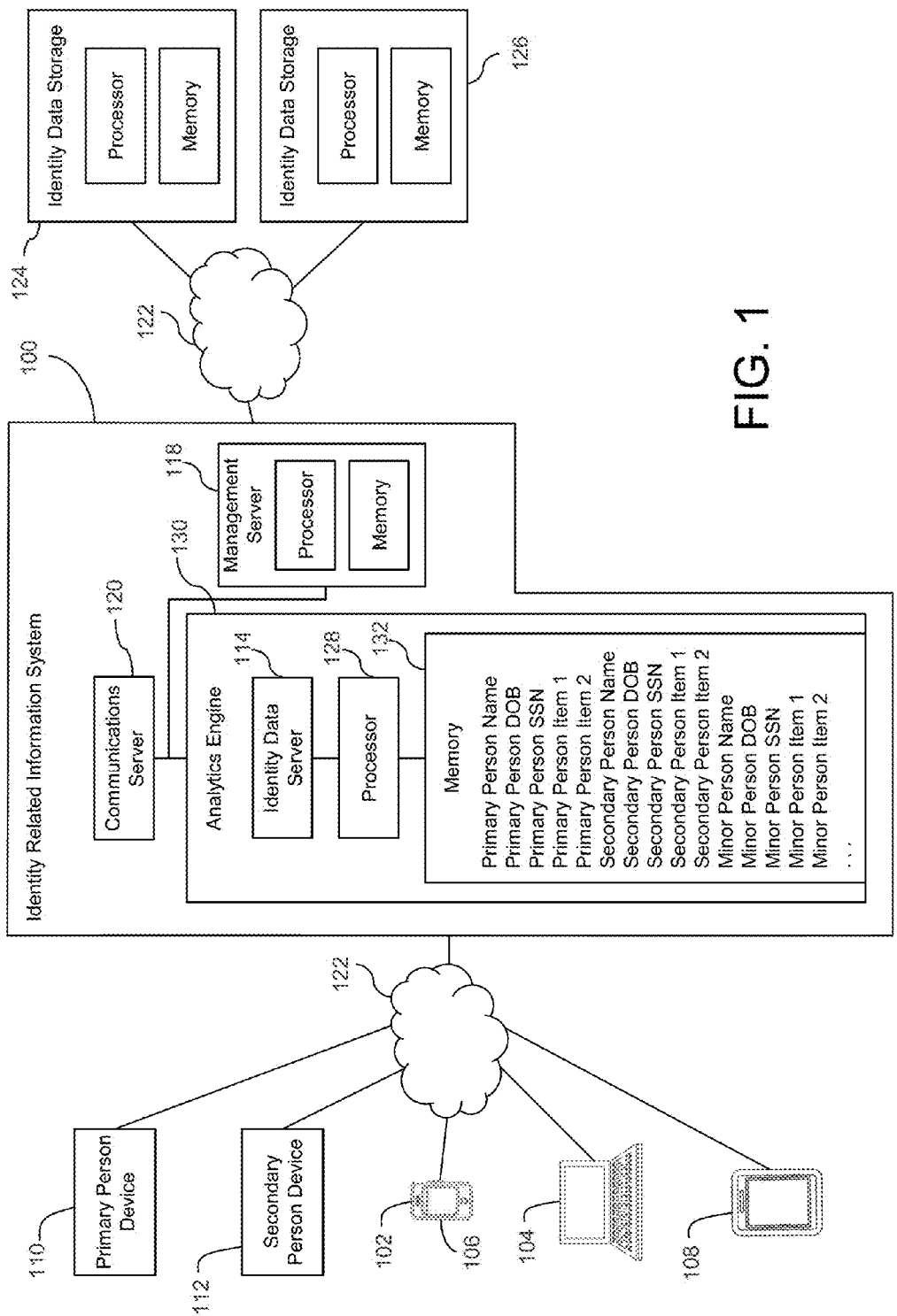
FIG. 1 depicts an example of an environment that includes an identity related information system according to an embodiment of the invention.

FIG. 1 depicts an example of an environment in which certain embodiments may be implemented. The identity related information system 100 can be owned or maintained by a regulated credit reporting agency or other entity and can communicate via the internet or other networks wirelessly or via wireline with subscriber devices 102 such as computers 104, smartphones 106, tablets 108 and other user devices used by subscribers and users. Other types of subscriber devices can be used. FIG. 1 shows a first such user device 110 titled, "primary person device" that is used by a primary person such as a subscriber for data or services provided by the identity related information system 100. FIG. 1 also shows a second such user device 112 titled "secondary person device" that is used by a secondary person who may or may not be a subscriber for data or other services provided by the identity related information system 100.

The identity related information system 100 can comprise multiple servers or other platforms or computing entities which may be connected or linked to each other in conventional fashion either locally or distantly such as by internet or other network. In the embodiment shown in FIG. 1, identity related information system 100 includes an analytics engine 130, a management server 118 and a communications server 120.

The communications server 120 can transmit messages to and receive messages from any or all subscriber devices 102 through the internet or other network 122. For example, communications server 102 can transmit and receive electronic mail messages to and from subscriber devices 102, and it can transmit and receive browser based or other types of messages to and from subscriber devices 102 in a session on the world wide web, other network or as otherwise desired. Generally though not necessarily a subscriber's user name and password must be entered into subscriber device 102 in order for subscriber device 102 to be granted access to information in identity related information system 100. Communications server 120 can communicate with subscriber devices 102 using electronic mail, SMS, via apps on the subscribers' devices, or as otherwise desired.

The identity related information system 100 can also communicate via the internet or other networks or otherwise with one or more credit related storage 124 such as databases maintained by regulated credit reporting agencies. It can also communicate via the internet or other networks or otherwise with one or more identity data storage 126 such as databases that maintain information related to individuals' identities. The identity related information system 100 can communicate with these platforms 124 and 126 to receive data that related to individuals' credit status, credit history, bank account, identity, and other data relevant to an individual's credit status and history and their identity, such data or derivatives of it, perhaps as mediated on the management server 118, for storage in analytics engine memory 132 or other memory in analytics engine 130 or identity related information system 100. Such communication can occur over the internet or other desired network 122, using communications server 120 or as otherwise desired.

The analytics engine memory 132 can store identity related data for a group of individuals or other entities. The data can be stored in a plurality of locations using flat file, relational or other database architectures. According to one embodiment of the invention, identity related data can be stored for a number of individuals and entities in locations organized by individual or entity. Thus, as shown in FIG. 1, a first dataset that corresponds to Primary Person 1 can include "Name," "Date of Birth," "SSN," "Item 1," "Item 2," . . . "Identity Item N." The same schema for data storage and location can be employed to store data for Primary Person 2, for a Minor Person, and for other individuals and entities.

The management server 118 is connected to analytics engine 130 and provides an interface for human or artificial intelligence to validate, edit, mediate and/or control data received from sources outside identity related information system 100 ultimately for storage in analytics engine memory 132. The management server 118 can also be employed to allow operators to inspect documents and other evidence in order to make decisions that allow validation of data, establishment of accounts for services to be provided by the identity related information system 100, verification of a Primary Person/Minor Person and/or Secondary Person/ Minor Person legal relationship as addressed below, or other situations where human or other mediation or control over data stored in analytics engine memory 132 is desired.

The analytics engine 130 can instruct system 100 to transmit and receive data and messages to and from subscriber devices 102, including primary person device 110 and secondary person device 112, through communications server 120; transmit data to and receive data from identity data storage 124, identity data storage 126 and management server 118; transmit instructions, data or other messages to and receive them from management server 118; and operate and execute on these messages, data and instructions to perform processes according to various embodiments of the invention as discussed more fully elsewhere in this document including in the disclosure below and FIGS. 3-6.

Figure 2:
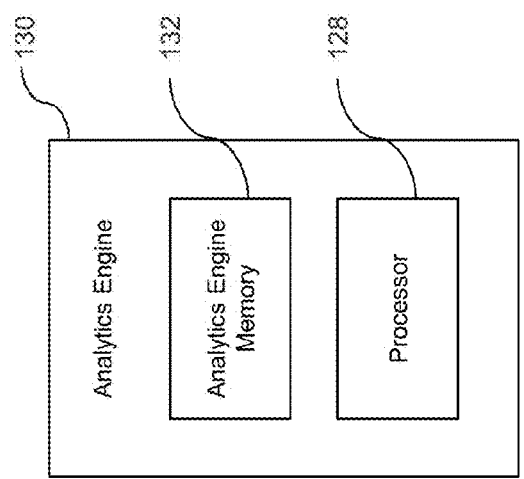
FIG. 2 is a block diagram of an analytics engine of FIG. 1.

FIG. 2 is a block diagram of analytics engine 130 of FIG. 1. Other implementations may be utilized, such as implementations that include multiple devices, each configured for performing selected functions.

The analytics engine 130 includes a processor 128 that can execute code stored on a tangible computer-readable medium in an analytics engine memory 132, to cause the analytics engine 130 to perform various functions and execute or otherwise carry out various processes. The analytics engine 130 may include any device that can store data, process data and execute code that is a set of instructions to perform functions. Examples of the devices include a database server, a web server, desktop personal computer, a laptop personal computer, a server device, a handheld computing device, and a mobile device.

Examples of the processor 128 include a microprocessor, an application-specific integrated circuit (ASIC), a state machine, or other suitable processor. The processor may include one processor or any number of processors. The processor can access code stored in the memory via a bus. The processor memory may be any non-transitory computer-readable medium configured for tangibly embodying code and can include electronic, magnetic, or optical devices. Examples of the processor memory include random access memory (RAM), read-only memory (ROM), a floppy disk, compact disc, digital video device, magnetic disk, an ASIC, a configured processor, or other storage device.

Instructions can be stored in the processor 128 or in analytics engine memory 132 as executable code. The instructions can include processor-specific instructions generated by a compiler and/or an interpreter from code written in any suitable computer-programming language. The instructions can include one or more applications, such as applications that (among other things) control transmitting and receiving of data and messages to and from subscriber devices 102, including primary person device 110 and secondary person device 112, through communications server 120; transmission of data to, receiving data from and analyzing data stored in credit data storage 126, identity data storage 126 and management server 118; transmitting instructions, data or other messages to and receiving them from management server 118; retrieving and executing on rules or instructions stored in analytics engine memory 132; operating on and/or evaluating data stored in analytics engine memory 132 that has been retrieved from credit data storage 124 and identity data storage 126 in order to, for example, determine if identity related information for a particular person such as primary person, secondary person or a minor person has changed or an identity related message should be transmitted to a subscriber such as primary person and/or secondary person, or whether transmission of messages to subscriber devices 102 should be frozen, or whether data as to a minor should be unfrozen, such as for example because the minor has reached the age of majority as calculated by processor 128 based on date of birth stored in storage 124 or 126 or analytics engine memory 132.

Each of identity data storage 124, identity data storage 126, management server 118 and communications server 120 may be structured similarly and operate similarly to analytics engine 130 with respect to processor, memory, internal communications and communications with other servers and other devices.

Figure 3:
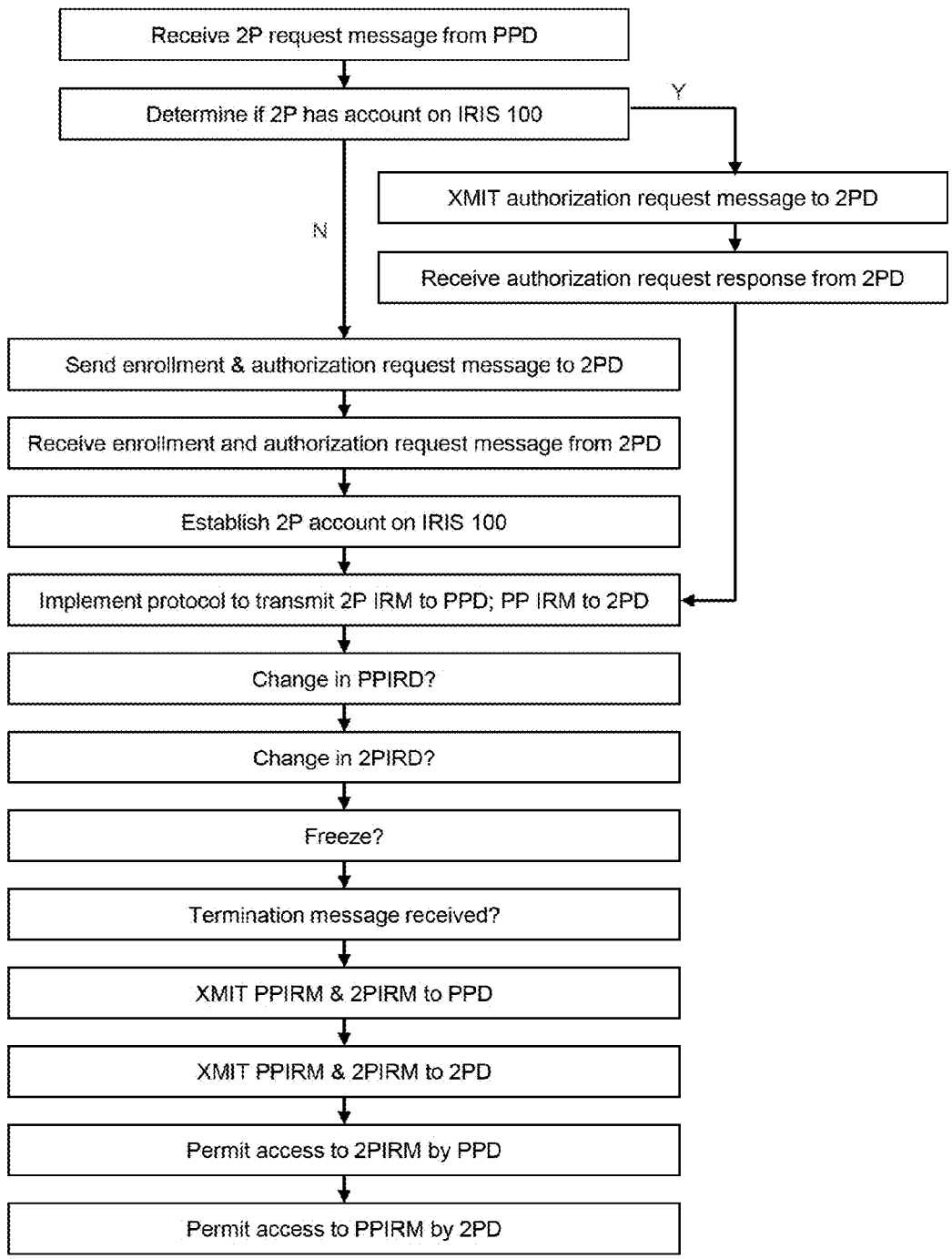
FIG. 3 is a process flow diagram of certain processes executed on the analytics engine of FIG. 2 according to an embodiment of the invention.

FIG. 3 is a process flow diagram of certain primary person/secondary person related processes which can be executed on the analytics engine 130 of FIG. 2 or otherwise in identity related information system 100 according to an embodiment of the invention. The process begins when the identity related information system 100 receives a secondary person request message 310 from a primary person device 112. Secondary person request message 310 can contain data such as name, residence and SSN to identify a secondary person as to whom the primary person desires to have identity related messages transmitted by the identity related information system 100 to the primary person device 110. Analytics engine 130 uses this identification information to determine whether secondary person has established an account on identity related information system 100.

If secondary person has already established an account on identity related information system 100, then analytics engine 130 makes a decision to instruct system 100 to transmit a secondary person authorization request message 312 to secondary person device 112, which decision can be executed on by communications server 120 or as otherwise desired by identity related information system 100 to transmit the secondary person authorization request message 312 to secondary person device 112. The identity related information system 100 can then receive a secondary person authorization response message 314 from secondary person device 112 which message can contain data indicating that secondary person authorizes identity related information system 100 to transmit identity related messages 316 to primary person device 110.

If secondary person has not already established an account on identity related information system 100, the analytics engine 130 makes a decision to instruct system 100 to transmit to secondary person device 112 an enrollment and authorization message 313, which decision can be executed on by communications server 120 or as otherwise desired by identity related information system 100 to transmit the secondary person enrollment and authorization request message 313 to secondary person device 112. The identity related information system 100 can then receive a secondary person enrollment and authorization response message 315 from secondary person device 112 which message can contain data indicating that secondary person authorizes identity related information system 100 to transmit identity related messages 316 to primary person device 110. Analytics engine 130 can interact with secondary person device 112 to establish an account for secondary person in identity related information system 100.

Upon receipt of secondary person authorization response message 314 or the secondary person enrollment and authorization response message 315, and after an account has been established in identity related information system 100 for secondary person, as the case may be, the analytics engine 130 can establish a schema wherein: (1) secondary person identity related messages 316 are transmitted to primary person device 110 (in addition to primary person identity related messages 316 being transmitted to primary person device 110); (2) primary person device 110 can gain access to secondary person identity related information stored in identity related information system 100 using primary person's user name and password; (3) primary person identity related messages 316 are transmitted to secondary person device 112 (in addition to secondary person identity related messages 316 being transmitted to secondary person device 112); and (4) secondary person device 112 can gain access to primary person identity related information stored in identity related information system 100 using secondary person's user name and password.

The analytics engine 130 can analyze data stored in analytics engine memory 132, credit data storage 124 and/or identity data storage 126 as to primary person, and data stored in analytics engine memory 132, credit data storage 124 and/or identity data storage 126 as to secondary person in order to determine if there has been a change in the data in a particular period of time. These components or functionalities can perform this analysis continuously, or periodically using predetermined periods of time such as hourly or daily. If these components or functionalities determine there has been a change in data for primary person, the identity related information system 100 can make a decision to transmit an identity related message 316 to primary person device 110. The identity related message 316 can also be transmitted to secondary person device 112 if the primary person and secondary person account with the identity related information system provides therefor. If these components or functionalities determine there has been a change in data for secondary person, the identity related information system 100 can make a decision to transmit an identity related message 316 to primary person device 110 and to secondary person device 112. The identity related message 316 transmitted to each of primary person device 110 and secondary person device 112 can contain data that, for example, informs primary person and secondary person, respectively, that data related to primary person stored in the identity related information system 100 has changed, or that data related to secondary person stored in the identity related information system 100 has changed. The identity related messages 316 can be transmitted by communications server 120 or other portions of identity management information system 100 as desired.

As to the primary person device 110, the identity related message 316 can also provide a link or instructions that allows primary person device 110 to access identity related data stored in identity related information system 100 pertaining to primary person, using primary person's user name and password, or other credentials, including out of wallet credentials for example. The identity related message 316 can also provide a link or instructions that allows primary person device 110 to access identity related data stored in identity related information system 100 pertaining to secondary person, using primary person's user name and password, or other credentials, including out of wallet credentials for example. The identity related information system 100 can then allow such access upon receipt of proper credentials.

As to the secondary person device 112, the identity related message 316 can also provide a link or instructions that allows secondary person device 112 to access identity related data stored in identity related information system 100 pertaining to secondary person, using secondary person's user name and password, or other credentials, including out of wallet credentials for example. As the case may be, the identity related message 316 can also provide a link or instructions that allows secondary person device 112 to access identity related data stored in identity related information system 100 pertaining to the primary person, using secondary person's user name and password, or other credentials, including out of wallet credentials for example. The identity related information system 100 can then allow such access upon receipt of proper credentials.

The analytics engine 130, before transmitting identity related messages 316, can determine if there is a legislative freeze, fraud freeze or other freeze in place as to either primary person or secondary person. Such determination can be made based on data from or freeze flag in analytics engine memory 132, credit data storage 124, identity data storage 126, and/or data from management server 118. If a freeze is in place for primary person, the analytics engine can make a decision to block transmitting by identity related information system 100 of identity related messages 316 to secondary person device 112 that pertain to primary person, and to preclude secondary person device 112 from accessing data stored in identity related information system 100 pertaining to primary person. If a freeze is in place for secondary person, the analytics engine can make a decision to block transmitting by identity related information system 100 of identity related messages 316 to primary person device 110 that pertain to secondary person, and to preclude primary person device 110 from accessing data stored in identity related information system 100 pertaining to secondary person.

Secondary person device 112 can, at any time, transmit a termination message 318 to identity related information system 100 instructing identity related information system 100 to stop transmitting identity related messages 316 to primary person device 110, and to stop allowing access of secondary person data stored on identity related information system by primary person device 110. Before transmitting identity related messages 316 that relate to secondary person to primary person device 110, the analytics engine 130 determines whether identity related information system 100 includes a flag or data that indicate such a termination message 318 has been received. If such a message 318 has been received, analytics engine 130 blocks transmitting to primary person device 110 any identity related messages 316 that relate to secondary person data stored in identity related management system 100, and blocks access to such data by primary person device 110. However, secondary person data stored in identity related information system 100 before that system receives the termination message 316 remains available to primary person.

Primary person device 110 can, at any time, transmit a termination message 318 to identity related information system 100 instructing identity related information system 100 to stop transmitting identity related messages 316 to secondary person device 112, and to stop allowing access of primary person data stored on identity related information system 100 by secondary person device 112. Before transmitting identity related messages 316 that relate to primary person to secondary person device 112, the analytics engine 130 determines whether identity related information system 100 includes a flag or data that indicate such a termination message 318 has been received. If such a message 318 has been received and a flag set, analytics engine 130 blocks transmitting to secondary person device 112 any identity related messages 316 that relate to primary person data stored in identity related management system 100, and blocks access to such data by secondary person device 112. However, primary person data stored in identity related information system 100 before that system receives the termination message 316 remains available to secondary person.

In accordance with certain embodiments of the invention, the primary person can designate multiple secondary persons and these embodiments can operate as disclosed in this document with respect to each such secondary person. For example, if a primary person designates two secondary persons, if the device of either secondary person is transmitted an identity related message 316, the primary person's device 110 and the other secondary person's device 112 can receive the same message, subject to freezes and terminations as disclosed below. Additionally, a secondary person device 112 can then operate as a primary person device 110 in accordance with certain embodiments of the invention; a secondary person who has agreed to reciprocal monitoring and sharing of predetermined identity related messages and information can in turn identify, via secondary person device 112 other persons (such as for example elderly parents) who can become secondary persons and whose devices then operate as secondary person devices 112.

Figure 4:
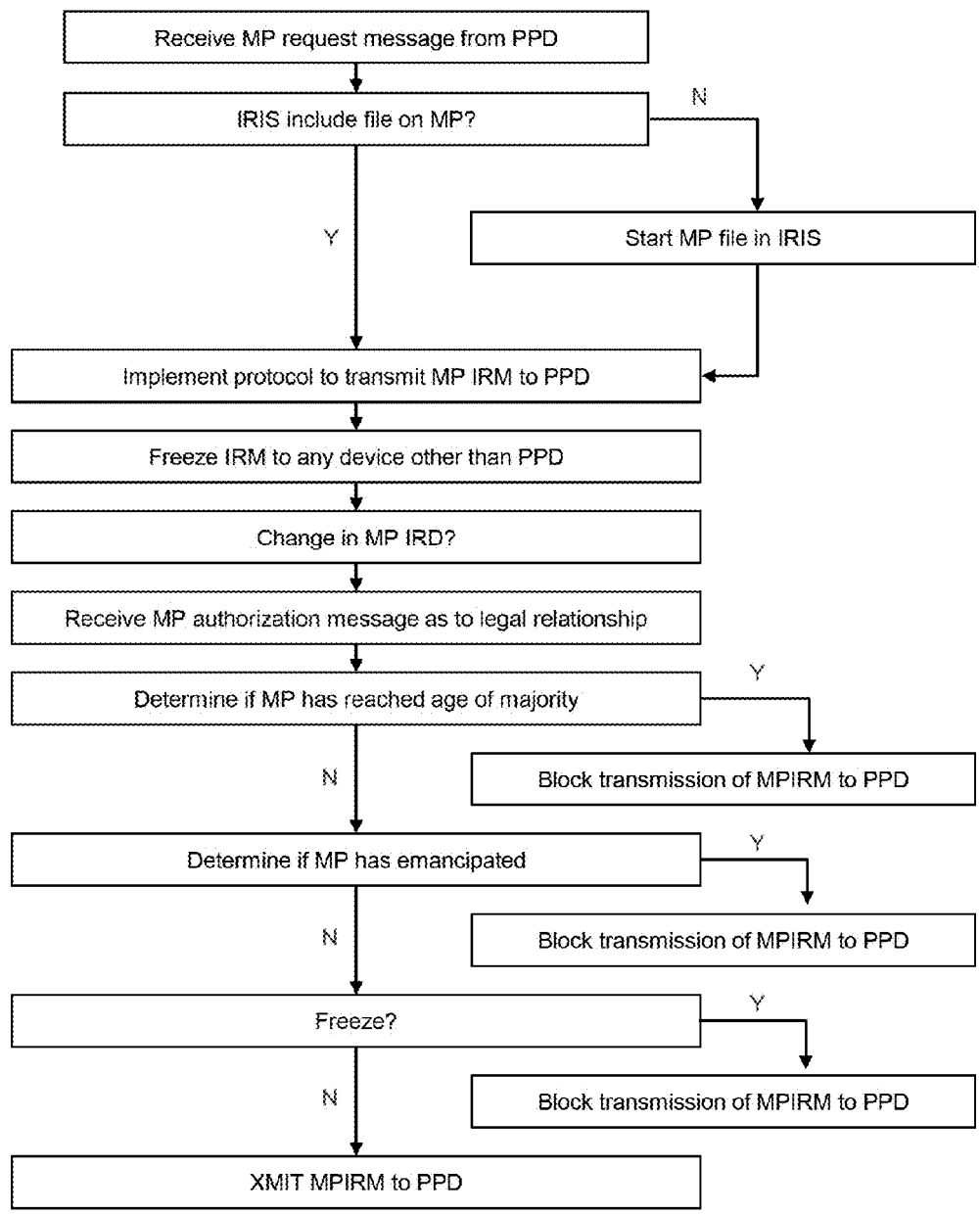
FIG. 4 is a process flow diagram of certain processes executed on the analytics engine of FIG. 2 according to another embodiment of the invention.

FIG. 4 is a process flow diagram of certain primary person/minor person related processes executed on the analytics engine 130 of FIG. 2 or as otherwise desired in identity related information system 100 according to an embodiment of the invention. The process begins when the identity related information system 100 receives a minor person request message 410 from a primary person device 110. Minor person request message 410 can contain data such as name, residence and SSN to identify a minor person, as to whom the primary person has a sufficient legal relationship and as to who primary person desires to have identity related messages transmitted by the identity related information system 100 to the primary person device 110. Analytics engine 130 uses this minor person identification information to determine whether identity related information system 100 has established a file that relates to minor person. If not, analytics engine 130 instructs identity related information system 100 to establish a file that relates to minor person, which begins storing identity data relating to minor person in that file.

The analytics engine 130 can implement logic wherein: (1) minor person identity related messages 416 are transmitted to primary person device 110 (in addition to primary person identity related messages 316 being transmitted to primary person device 110); and (2) primary person device 110 can gain access to minor person identity related information stored in identity related information system 100 using primary person's user name and password.

The analytics engine 130 can analyze data stored in analytics engine memory 132, credit data storage 124 and/or identity data storage 126 as to primary person, and data stored in analytics engine memory 132, credit data storage 124 and/or identity data storage 126 as to minor person in order to determine if there has been a change in the data in a particular period of time. These components or functionalities can perform this analysis continuously, or periodically using predetermined periods of time such as hourly or daily. If these components or functionalities determine there has been a change in data for primary person, the identity related information system 100 can make a decision to transmit an identity related message 316 to primary person device 110. If these components or functionalities determine there has been a change in data for minor person, the identity related information system 100 can make a decision to transmit a minor person identity related message 416 to primary person device 110.

However, before such minor person related identity related message 416 transmissions occur, primary person must establish facts that show minor person and primary person have a sufficient legal relationship to support transmission by identity related information system 100 of identity related messages 416 as to minor person to primary person device 110, and to allow access by primary person device 110 to minor person identity related data stored on identity related information system 100. For example, primary person can submit legal documents to an operator of management server 118 that prove primary person is parent or guardian of minor person. The operator of management server 118 can, upon determination that such documents establish a sufficient legal relationship between primary person and minor person, set a flag or otherwise enter into management server 118 data to the effect that such a sufficient legal relationship has been established. Management server 118 can then transmit to analytics engine 130 a minor person authorization message 412 that authorizes analytics engine 130 to operate consistently with transmission of identity related messages 416 as to minor person to primary person device 110, and allowance of access by primary person device 110 to minor person identity related data stored on identity related information system 100.

The identity related messages 316 and 416 transmitted to primary person device 110 can contain data that, for example, inform primary person that data related to primary person and/or minor person, as the case may be, stored in the identity related information system 100 have changed. The identity related messages 316 and 416 can be transmitted by communications server 120 or other portions of identity management information system 100 as desired.

As to the primary person device 110, the identity related message 316 can also provide a link or instructions that allows primary person device 110 to access identity related data stored in identity related information system 100, using primary person's user name and password, or other credentials, including out of wallet credentials for example. The minor person identity related message 416 can also provide a link or instructions that allows primary person device 110 to access minor person identity related data stored in identity related information system 100 pertaining to minor person, using primary person's user name and password, or other credentials, including out of wallet credentials for example. The identity related information system 100 can then allow such access upon receipt of proper credentials.

The analytics engine 130, upon receiving the minor person authorization message 412, automatically establishes a minor status freeze on transmission of minor person identity related messages 416 to any device other than primary person device 110 and on access by any device other than primary person device 110 to minor person identity related information stored in identity related management system. The identity related information system 100 can also discontinue determining if there is a change in predetermined minor person identity related information stored in the identity related information system when the identity related information system receives an emancipation message that the minor has emancipated or when the identity related information system detects expiration of a predetermined time period after date of birth stated in the minor person's identity related information.

If the analytics engine 130 determines that minor person has not reached the age of majority and has not emancipated or otherwise should not be treated as a secondary person instead of a minor person, it nevertheless, before transmitting minor person identity related messages 416 to primary person device 110, can determine if there is a legislative freeze, fraud freeze or other freeze in place as to minor person that proscribes transmission of minor person identity related messages 416 to primary person device and/or access by primary person device 110 to minor person identity related data stored in identity related information system 100. Such determination can be made based on data from or freeze flag in analytics engine memory 132, data from credit data store 124, identity data store 126, and/or data from management server 118. If a freeze is in place for minor person, the analytics engine can make a decision to block transmitting by identity related information system 100 of minor person identity related messages 416 to primary person device 110, and to preclude primary person device 110 from accessing minor person identity related data stored in identity related information system 100.

Primary persons and secondary persons can, via their devices 110 and 112, respectively, identify multiple minor persons whose identity related messages 416 can be transmitted to primary person devices 110 and secondary person devices 112 as disclosed in this document.

Figure 5:
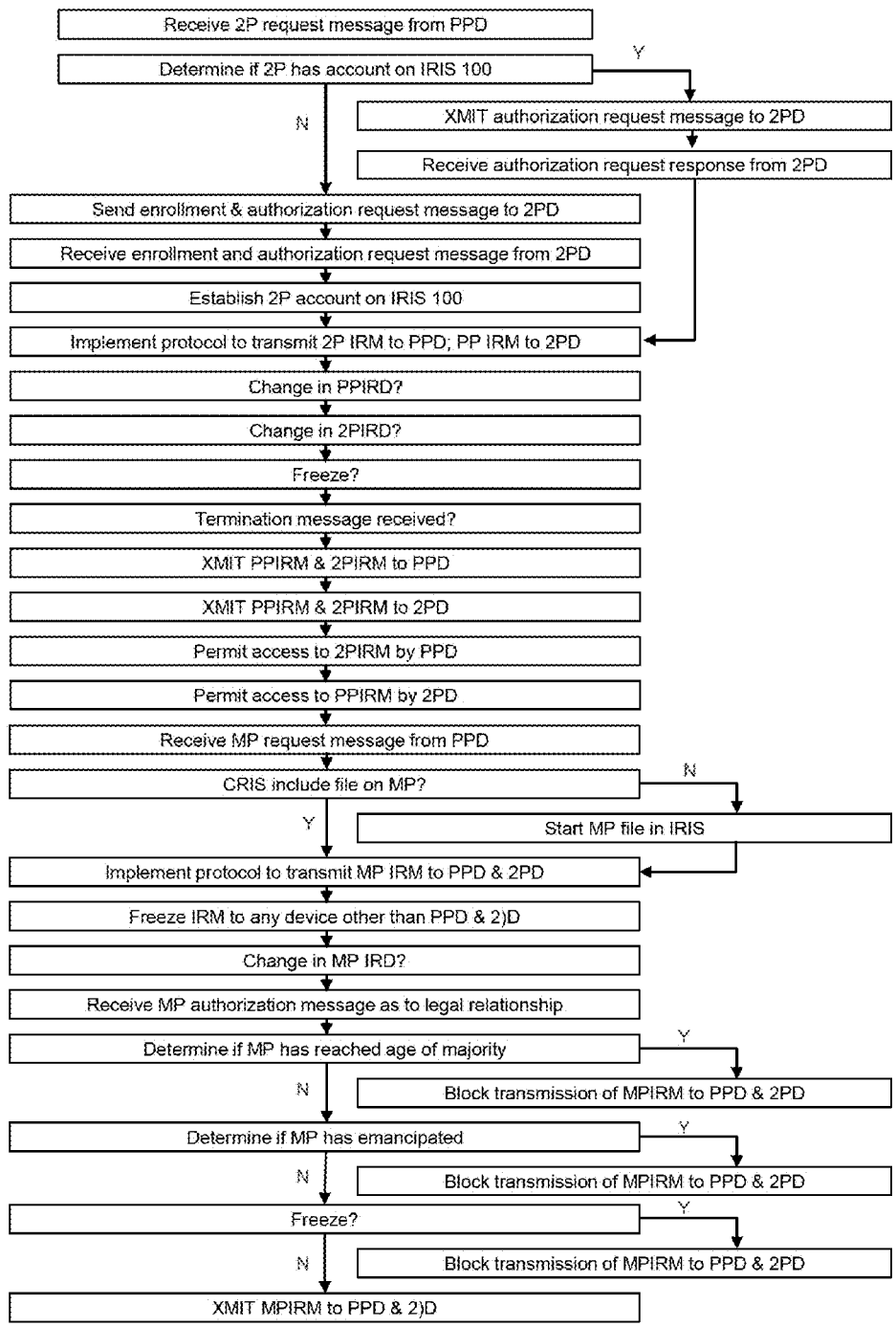
FIG. 5 is a process flow diagram of certain processes executed on the analytics engine of FIG. 2 according to another embodiment of the invention.

FIG. 5 is a process flow diagram of certain primary person/secondary person/minor person related processes executed on the analytics engine 130 of FIG. 2 or as otherwise desired in identity related information system 100 according to an embodiment of the invention. The process begins when the identity related information system 100 receives a secondary person request message 510 from a primary person device 112. Secondary person request message 510 can contain data such as name, residence and SSN to identify a secondary person as to whom the primary person desires to have identity related messages transmitted by the identity related information system 100 to the primary person device 110. Analytics engine 130 uses this identification information to determine whether secondary person has established an account on identity related information system 100.

If secondary person has already established an account on identity related information system 100, then analytics engine 130 makes a decision to instruct system 100 to transmit a secondary person authorization request message 512 to secondary person device 112, which decision can be executed on by communications server 120 or as otherwise desired by identity related information system 100 to transmit the secondary person authorization request message 512 to secondary person device 112. The identity related information system 100 can then receive a secondary person authorization response message 514 from secondary person device 112 which message can contain data indicating that secondary person authorizes identity related information system 100 to transmit identity related messages 316 to primary person device 110.

If secondary person has not already established an account on identity related information system 100, the analytics engine 130 makes a decision to instruct system 100 to transmit to secondary person device 112 an enrollment and authorization message 513, which decision can be executed on by communications server 120 or as otherwise desired by identity related information system 100 to transmit the secondary person enrollment and authorization request message 513 to secondary person device 112. The identity related information system 100 can then receive a secondary person enrollment and authorization response message 515 from secondary person device 112 which message can contain data indicating that secondary person authorizes identity related information system 100 to transmit identity related messages 516 to primary person device 110. Analytics engine 130 can interact with secondary person device 112 to establish an account for secondary person in identity related information system 100.

Upon receipt of secondary person authorization response message 514 or the secondary person enrollment and authorization response message 515, and after an account has been established in identity related information system 100 for secondary person, as the case may be, the analytics engine 130 can implement logic wherein: (1) secondary person identity related messages 516 are transmitted to primary person device 110 (in addition to primary person identity related messages 516 being transmitted to primary person device 110); (2) primary person device 110 can gain access to secondary person identity related information stored in identity related information system 100 using primary person's user name and password; (3) primary person identity related messages 516 are transmitted to secondary person device 112 (in addition to secondary person identity related messages 516 being transmitted to secondary person device 112); and (4) secondary person device 112 can gain access to primary person identity related information stored in identity related information system 100 using secondary person's user name and password.

The analytics engine 130 can analyze data stored in analytics engine memory 132, credit data storage 124 and/or identity data storage 126 as to primary person, and data stored in analytics engine memory 132, credit data storage 124 and/or identity data storage 126 as to secondary person in order to determine if there has been a change in the data in a particular period of time. These components or functionalities can perform this analysis continuously, or periodically using predetermined periods of time such as hourly or daily. If these components or functionalities determine there has been a change in data for primary person, the identity related information system 100 can make a decision to transmit an identity related message 516 to primary person device 110. The identity related message 516 can also be transmitted to secondary person device 112 if the primary person and secondary person account with the identity related information system provides therefor. If these components or functionalities determine there has been a change in data for secondary person, the identity related information system 100 can make a decision to transmit an identity related message 516 to primary person device 110 and to secondary person device 112. The identity related message 516 transmitted to each of primary person device 110 and secondary person device 112 can contain data that, for example, informs primary person and secondary person, respectively, that data related to primary person stored in the identity related information system 100 has changed, or that data related to secondary person stored in the identity related information system 100 has changed. The identity related messages 516 can be transmitted by communications server 120 or other portions of identity management information system 100 as desired.

As to the primary person device 110, the identity related message 516 can also provide a link or instructions that allows primary person device 110 to access identity related data stored in identity related information system 100 pertaining to primary person, using primary person's user name and password, or other credentials, including out of wallet credentials for example. The identity related message 516 can also provide a link or instructions that allows primary person device 110 to access identity related data stored in identity related information system 100 pertaining to secondary person, using primary person's user name and password, or other credentials, including out of wallet credentials for example. The identity related information system 100 can then allow such access upon receipt of proper credentials.

As to the secondary person device 112, the identity related message 516 can also provide a link or instructions that allows secondary person device 112 to access identity related data stored in identity related information system 100 pertaining to secondary person, using secondary person's user name and password, or other credentials, including out of wallet credentials for example. As the case may be, the identity related message 516 can also provide a link or instructions that allows secondary person device 112 to access identity related data stored in identity related information system 100 pertaining to the primary person, using secondary person's user name and password, or other credentials, including out of wallet credentials for example. The identity related information system 100 can then allow such access upon receipt of proper credentials.

The analytics engine 130, before transmitting identity related messages 516, can determine if there is a legislative freeze, fraud freeze or other freeze in place as to either primary person or secondary person. Such determination can be made based on data from or freeze flag in analytics engine memory 132, credit data store 124, identity data store 126, and/or data from management server 118. If a freeze is in place for primary person, the analytics engine can make a decision to block transmitting by identity related information system 100 of identity related messages 516 to secondary person device 112 that pertain to primary person, and to preclude secondary person device 112 from accessing data stored in identity related information system 100 pertaining to primary person. If a freeze is in place for secondary person, the analytics engine can make a decision to block transmitting by identity related information system 100 of identity related messages 516 to primary person device 110 that pertain to secondary person, and to preclude primary person device 110 from accessing data stored in identity related information system 100 pertaining to secondary person.

Secondary person device 112 can, at any time, transmit a termination message 518 to identity related information system 100 instructing identity related information system 100 to stop transmitting identity related messages 516 to primary person device 110, and to stop allowing access of secondary person data stored on identity related information system by primary person device 110. Before transmitting identity related messages 516 that relate to secondary person to primary person device 110, the analytics engine 130 determines whether identity related information system 100 includes a flag or data that indicate such a termination message 518 has been received. If such a message 518 has been received, analytics engine 130 blocks transmitting to primary person device 110 any identity related messages 516 that relate to secondary person data stored in identity related management system 100, and blocks access to such data by primary person device 110. However, secondary person data stored in identity related information system 100 before that system receives the termination message 516 remains available to primary person.

Primary person device 110 can, at any time, transmit a termination message 518 to identity related information system 100 instructing identity related information system 100 to stop transmitting identity related messages 516 to secondary person device 112, and to stop allowing access of primary person data stored on identity related information system 100 by secondary person device 112. Before transmitting identity related messages 516 that relate to primary person to secondary person device 112, the analytics engine 130 determines whether identity related information system 100 includes a flag or data that indicate such a termination message 518 has been received. If such a message 518 has been received and a flag is set, analytics engine 130 blocks transmitting to secondary person device 112 any identity related messages 516 that relate to primary person data stored in identity related management system 100, and blocks access to such data by secondary person device 112. However, primary person data stored in identity related information system 100 before that system receives the termination message 516 remains available to secondary person.

The process flow of FIG. 5 also allows primary person and/or secondary person to receive minor person identity related messages 516 and to access minor person identity related data stored on identity related information system 100. Identity related information system 100 receives a minor person request message 520 from a primary person device 110 or a secondary person device 112. Minor person request message 520 can contain data such as name, residence and SSN to identify a minor person, as to whom the primary person and/or secondary person has a sufficient legal relationship and as to who primary person and/or secondary person desires to have identity related messages transmitted by the identity related information system 100 to the primary person device 110 and/or the secondary person device. Analytics engine 130 uses this minor person identification information to determine whether identity related information system 100 has established a file that relates to minor person. If not, identity related information system 100 establishes a file that relates to minor person, and begins storing identity data relating to minor person in that file.

The analytics engine 130 can implement logic wherein: (1) minor person identity related messages 516 are transmitted to primary person device 110 and/or secondary person device 112 (in addition to primary person identity related messages 516 being transmitted to primary person device 110 and secondary person identity related messages 516 being transmitted to secondary person device 112); and (2) primary person device 110 and/or secondary person device 112 can gain access to minor person identity related information stored in identity related information system 100 using primary person's user name and password or secondary person's user name and password as the case may be.

The analytics engine 130 can analyze data stored in analytics engine memory 132, credit data storage 124 and/or identity data storage 126 as to minor person in order to determine if there has been a change in the data in a particular period of time. These components or functionalities can perform this analysis continuously, or periodically using predetermined periods of time such as hourly or daily. If these components or functionalities determine there has been a change in data for minor person, the identity related information system 100 can make a decision to transmit a minor person identity related message 516 to primary person device 110 and/or secondary person device 112. The identity related messages 516 can contain data that, for example, inform primary person and/or secondary person that data related to minor person stored in the identity related information system 100 has changed. The identity related messages 516 can be transmitted by communications server 120 or other portions of identity management information system 100 as desired.

However, before such minor person identity related message 516 transmissions occur, primary person and/or secondary person must also establish facts that show minor person and each of primary person and secondary person have a sufficient legal relationship to support transmission by identity related information system 100 of identity related messages 516 as to minor person to primary person device 110 and secondary person device 112, and to allow access by primary person device 110 and secondary person device 112 to minor person identity related data stored on identity related information system 100. If secondary person is unable to establish such sufficient legal relationship, then identity related messages 516 will not be transmitted by identity related information system 100 to secondary person device 112, and secondary person device 112 will not be able to access minor person identity data stored in identity related information system 100; the same rule is true for primary person.

To prove sufficient legal relationship, primary person and/or secondary person can submit legal documents to an operator of management server 118 that prove primary and/or secondary person are parents or guardians of minor person. The operator of management server 118 can, upon determination that such documents establish a sufficient legal relationship between primary person and secondary person, on the one hand, and minor person on the other, set a flag or otherwise enter into management server 118 data to the effect that such a sufficient legal relationship has been established. Management server 118 can then transmit to analytics engine 130 a minor person authorization message 522 that authorizes analytics engine 130 to operate consistently with transmission of identity related messages 516 as to minor person to primary person device 110 and/or secondary person device 112, and allowance of access by primary person device 110 and/or secondary person device 112 to minor person identity related data stored on identity related information system 100.

As to the primary person device 110 and/or secondary person device 112, the identity related message 516 can also provide a link or instructions that allows primary person device 110 and/or secondary person device 112 to access minor person identity related data stored in identity related information system 100, using the user name and password, or other credentials, including out of wallet credentials for example, of primary person or secondary person as the case may be. The identity related information system 100 can then allow such access upon receipt of proper credentials.

The analytics engine 130, upon receiving the minor person authorization message 512, automatically establishes a minor status freeze on transmission of minor person identity related messages 516 to any device other than primary person device 110 and/or secondary person device 112 and on access by any device other than primary person device 110 and/or secondary person device 112 to minor person identity related information stored in identity related management system 100. The identity related information system 100 can also discontinue determining if there is a change in predetermined minor person identity related information stored in the identity related information system when the identity related information system receives an emancipation message that the minor has emancipated or when the identity related information system detects expiration of a predetermined time period after date of birth stated in the minor person's identity related information.

If the analytics engine 130 determines that minor person has not reached the age of majority and has not emancipated or otherwise should not be treated as a secondary person instead of a minor person, it nevertheless, before transmitting minor person identity related messages 516 to primary person device 110 or secondary person device 112, can determine if there is a legislative freeze, fraud freeze or other freeze in place as to minor person that proscribes transmission of minor person identity related messages 516 to primary person device 110 and/or secondary person device 112, and/or access by primary person device 110 and/or secondary person device 112 to minor person identity related data stored in identity related information system 100. Such determination can be made based on data from or freeze flag in analytics engine memory 132, credit data store 124, identity data store 126, and/or data from management server 118. If a freeze is in place for minor person, the analytics engine can make a decision to block transmitting by identity related information system 100 of minor person identity related messages 516 to primary person device 110 and/or secondary person device 112, and to preclude primary person device 110 and/or secondary person device 112 from accessing minor person identity related data stored in identity related information system 100.

In accordance with certain embodiments of the invention, the primary person can designate multiple secondary persons and these embodiments can operate as disclosed in this document with respect to each such secondary person. For example, if a primary person designates two secondary persons, if the device of either secondary person is transmitted an identity related message 516, the primary person's device 110 and the other secondary person's device 112 can receive the same message, subject to freezes and terminations as disclosed below. Additionally, a secondary person device 112 can then operate as a primary person device 110 in accordance with certain embodiments of the invention; a secondary person who has agreed to reciprocal monitoring and sharing of predetermined identity related messages 516 and information can in turn identify, via secondary person device 112 other persons (such as for example elderly parents) who can become secondary persons and whose devices then operate as secondary person devices 112.

Primary persons and secondary persons can, via their devices 110 and 112, respectively, identify multiple minor persons whose identity related messages 516 can be transmitted to primary person devices 110 and secondary person devices 112 as disclosed in this document.

General

Certain aspects of the subject matter and the functional operations described in this specification can be implemented in digital electronic circuitry, or in computer software, firmware, or hardware, including the structures disclosed in this specification and their structural equivalents, or in combinations of one or more of them. Certain aspects of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated communication, or a combination of one or more of them. The term "data processing device" encompasses all apparatus, devices, and machines for processing data, including by way of example a programmable processor, a computer, or multiple processors or computers. The device can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and a device can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, certain aspects of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Certain aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope or of what may be claimed in an application or patent claiming priority hereto or otherwise, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of any claims. For example, the actions recited in the claims can be performed in a different order and still achieve desirable results.

What is claimed is:

1. A method for transmitting identity related messages, the method comprising:
   storing, on an identity-related information system, primary person identity-related information related to a primary person, the primary person identity-related information accessible by a primary person device in response to the system receiving primary person username and password information from the primary person device, wherein the primary person identity-related information comprises information from which the primary person is uniquely identifiable and information describing at least one of a credit history or credit status of the primary person;
   storing, on the identity-related information system, secondary person identity-related information related to a secondary person, the secondary person identity-related information accessible by a secondary person device in response to receiving secondary person username and password information from the secondary person device, wherein the secondary person identity-related information comprises-information from which the secondary person is uniquely identifiable and information describing at least one of a credit history or credit status of the secondary person, wherein the secondary person identity-related information is inaccessible to the primary person unless authorization has been received from the secondary person device;
   receiving, by the identity-related information system, a secondary person request message from the primary person device, the secondary person request message requesting that predetermined secondary person identity-related messages relating to the secondary person identity-related information be transmitted to the primary person device;
   automatically determining whether the identity-related information system includes an account for the secondary person who is a subject of the secondary person request message;
   in response to determining that the identity-related information system includes the account for the secondary person who is the subject of the secondary person request message, transmitting, by the identity-related information system, a secondary person authorization request message to the secondary person device, the secondary person authorization request message including a request for authorization to transmit the predetermined secondary person identity-related messages to the primary person device;
   receiving, by the identity-related information system, a secondary person authorization response message from the secondary person device, the secondary person authorization response message authorizing the identity-related information system to transmit the predetermined secondary person identity-related messages to the primary person device;
   determining, by the identity-related information system, a change in predetermined secondary person identity-related information describing the at least one of the credit history or the credit status of the secondary person stored in the identity-related information system;
   transmitting, by the identity-related information system, a predetermined secondary person identity-related message to the primary person device based on determining the change in the predetermined secondary person identity-related information describing the at least one of the credit history or the credit status of the secondary person; and
   automatically ceasing transmission of secondary person identity-related messages to the primary person device based on the identity-related information system detecting a fraud event associated with the secondary person.

2. A method according to claim 1, further comprising transmitting predetermined primary person identity-related messages to the secondary person device based on the identity-related information system determining a change in predetermined primary person identity-related information stored in the identity-related information system.

3. A method according to claim 2, further comprising automatically ceasing transmission of primary person identity-related messages to the secondary person device based on the identity-related information system detecting a fraud event associated with the primary person.

4. A method according to claim 1, further comprising cancelling transmission of the secondary person identity-related messages to the primary person device in response to the identity-related information system receiving a secondary person cancellation message transmitted from the secondary person device.

5. A method according to claim 4, further comprising, subsequent to transmission of the secondary person identity-related messages to the primary person device being cancelled, continuing to make accessible secondary person identity-related information stored in the identity-related information system before time of receipt by the system of the cancellation message.

6. A method according to claim 1, further comprising, in response to the primary person device receiving a secondary person identity-related message, allowing access by the primary person device to secondary person identity-related information stored in the identity-related information system using the primary person user name and password.

7. A method according to claim 1, further comprising allowing control by the secondary person device of secondary person identity-related information that is accessible by the primary person device.

8. A system for transmitting identity-related messages, the system comprising:
   a processor;
   a non-transitory computer-readable memory device configured to store:
      primary person identity-related information related to a primary person, the primary person identity-related information accessible by a primary person device in response to the system receiving primary person username and password information from the primary person device, wherein the primary person identity-related information comprises information from which the primary person is uniquely identifiable and information describing at least one of a credit history or credit status of the primary person; and secondary person identity-related information related to a secondary person, the secondary person identity-related information accessible by a secondary person device in response to receiving secondary person username and password information from the secondary person device, wherein the secondary person identity-related information comprises information from which the secondary person is uniquely identifiable and information describing at least one of a credit history or credit status of the secondary person, wherein the secondary person identity-related information is inaccessible to the primary person unless authorization has been received from the secondary person device; and an analytics engine stored in the non-transitory computer-readable memory device or another non-transitory computer-readable medium and executable by the processor of the system, the analytics engine configured to:

receive a secondary person request message from the primary person device, the secondary person request message requesting that predetermined secondary person identity-related messages relating to the secondary person identity-related information be transmitted to the primary person device;

automatically determine whether the identity-related information system includes an account for the secondary person who is a subject of the secondary person request message;

in response to determining that the identity-related information system includes the account for the secondary person who is the subject of the secondary person request message, instruct the identity-related information system to transmit a secondary person authorization request message to the secondary person device, the secondary person authorization request message including a request for authorization to transmit the predetermined secondary person identity-related messages to the primary person device;

receive secondary person authorization response data from the secondary person device, the secondary person authorization response data authorizing the identity-related information system to transmit the predetermined secondary person identity-related messages to the primary person device;

determine a change in predetermined secondary person identity-related information describing the at least one of the credit history or the credit status of the secondary person stored in the memory device; and instruct the identity-related information system to transmit a predetermined secondary person identity-related message to the primary person device based on the analytics engine determining the change in the predetermined secondary person identity-related information describing the at least one of the credit history or the credit status of the secondary person;

instruct the identity-related information system to automatically cease transmission of secondary person identity-related messages to the primary person device based on the identity-related information system detecting a fraud event associated with the secondary person.

9. A system according to claim 8, wherein the analytics engine is configured to instruct the identity-related information system to transmit predetermined primary person identity-related messages to the secondary person device based on the identity-related information system determining the change in the predetermined primary person identity-related information stored in the memory device.

10. A system according to claim 9, wherein the analytics engine is configured to automatically instruct the identity-related information system to cease transmission of primary person identity-related messages to the secondary person device based on the identity-related information system detecting a fraud event associated with the primary person.

11. A system according to claim 8, wherein the analytics engine is configured to instruct the identity-related information system to cancel transmission of the secondary person identity-related messages to the primary person device in response to the identity-related information system receiving a secondary person cancellation message transmitted from the secondary person device.

12. A system according to claim 11, wherein the analytics engine is configured to continue to make accessible secondary person identity-related information stored in the identity-related information system before time of receipt by the system of the cancellation message, subsequent to transmission of the secondary person identity-related messages to the primary person device being cancelled.

13. A system according to claim 8, wherein the analytics engine is configured to allow access by the primary person device to secondary person identity-related information stored in the identity-related information system using the primary person user name and password.

14. A system according to claim 8, wherein the analytics engine is configured to allow control by the secondary person device of secondary person identity-related information that is accessible by the primary person device.

* * * * *